(12) United States Patent
Furuya et al.

(10) Patent No.: US 9,263,184 B2
(45) Date of Patent: Feb. 16, 2016

(54) SIMULATION APPARATUS AND SIMULATION METHOD

(75) Inventors: Atsushi Furuya, Yokohama (JP); Yuji Uehara, Kawasaki (JP); Hirotaka Oshima, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 469 days.

(21) Appl. No.: 13/558,561

(22) Filed: Jul. 26, 2012

(65) Prior Publication Data

US 2013/0073270 A1    Mar. 21, 2013

(30) Foreign Application Priority Data

Sep. 15, 2011   (JP) ................................ 2011-202398

(51) Int. Cl.
*G06F 17/50*  (2006.01)
*H01F 41/02*  (2006.01)
*G01R 33/00*  (2006.01)
*H01F 1/36*   (2006.01)

(52) U.S. Cl.
CPC ........ *H01F 41/0246* (2013.01); *G01R 33/0064* (2013.01); *G06F 17/5009* (2013.01); *G06F 2217/16* (2013.01); *H01F 1/36* (2013.01)

(58) Field of Classification Search
CPC ............ H01F 41/0246; G01R 33/0064; G06F 17/5009
USPC .......................................................... 703/14
See application file for complete search history.

(56) References Cited

U.S. PATENT DOCUMENTS

| | | | |
|---|---|---|---|
| 6,772,076 B2 * | 8/2004 | Yamamoto et al. ............. | 702/65 |
| 7,058,527 B2 * | 6/2006 | Shimizu ......................... | 702/66 |
| 7,236,899 B1 * | 6/2007 | Shimizu ......................... | 702/66 |
| 8,169,213 B2 * | 5/2012 | Shimamura et al. .......... | 324/205 |
| 2003/0083832 A1 * | 5/2003 | Takano .......................... | 702/65 |

OTHER PUBLICATIONS

Kim et al.("Analysis of Hysteresis Motor Using Finite Element Method and Magnetization-Dependent Model", IEEE,2000, pp. 685-688).*
Marcsa et al.("Direct Preisach Hysteresis Model for Finite Element Analysis of Magnetic Fields", (Electrical Review), ISSN 0033-2097, R. 85 NR Dec. 2009, pp. 114-117).*
David Meeker (Finite Element Method Magnetics, User's Manual, Version 4.2, Oct. 16, 2010 pp. 1-158).*

(Continued)

*Primary Examiner* — Omar Fernandez Rivas
*Assistant Examiner* — Iftekhar Khan
(74) *Attorney, Agent, or Firm* — Fujitsu Patent Center

(57) ABSTRACT

A computer-readable medium stores a magnetic substrate simulation program causing a computer to execute a process that includes calculating an effective magnetic field for each area of an element in the magnetic substrate, when magnetization of each area changes and based on a magnetic field generated from magnetic energy in each area and a rate of change of magnetization working in a direction inhibiting change in the average magnetization of the areas; obtaining for each area and based on the calculated effective magnetic fields and magnetization of each area, changes in magnetization and calculating for each area, magnetization after the changes; judging based on magnetization of each area before and after the changes, whether magnetization in the element converges; and storing a combination of the average magnetization of the areas for which magnetization in the given element converges and a static magnetic field based on the average magnetization.

5 Claims, 14 Drawing Sheets

(56) References Cited

OTHER PUBLICATIONS

Yamazaki, et al.; "Iron Loss Analysis of IPM Motor Considering Carrier Harmonics," IEEJ Trans. IA, vol. 125, No. 7; (English Abstract) pp. 758-766 (2005).

Matsuo, et al.; "Representation of minor hysteresis loops of a silicon steel sheet using stop and play models," Elsevier B.V.; Science Direct, Physica B 372; pp. 25-29 (2006).

Brown; "Thermal Fluctuations of a Single-Domain Particle," Physical Review, vol. 130, No. 5; pp. 1677-1686 (Jun. 1, 1963).

Matsuo, et al.; "A Study of Demagnetizing Field in Micromagneic Simulation under Periodic Boundary Condition," IEE Japan (English Abstract); pp. 87-92 (Jan. 28, 2010).

Kawano, et al.; "The grain size effect on the magnetic properties in NiZn ferrite and the quality factor of the inductor", Journal of Magnetism and Magnetic Materials 321, Elsevier B.V.; pp. 2488-2493 (2009).

"Extended European Search Report" mailed by EPO and corresponding to European application No. 12178326.0 on Feb. 6, 2013.

Van De Wiele, Ben et al., "Fast numerical three-dimensional scheme for the simulation of hysteresis in ferromagnetic grains," Journal of applied physics, pp. 073909 to 073909-9 (Apr. 10, 2007).

Van De Wiele, Ben et al., "Energy considerations in a micromagnetic hysteresis model and the Preisach model," Journal of applied physics, pp. 103902 to 103902-10 (Nov. 17, 2010).

\* cited by examiner

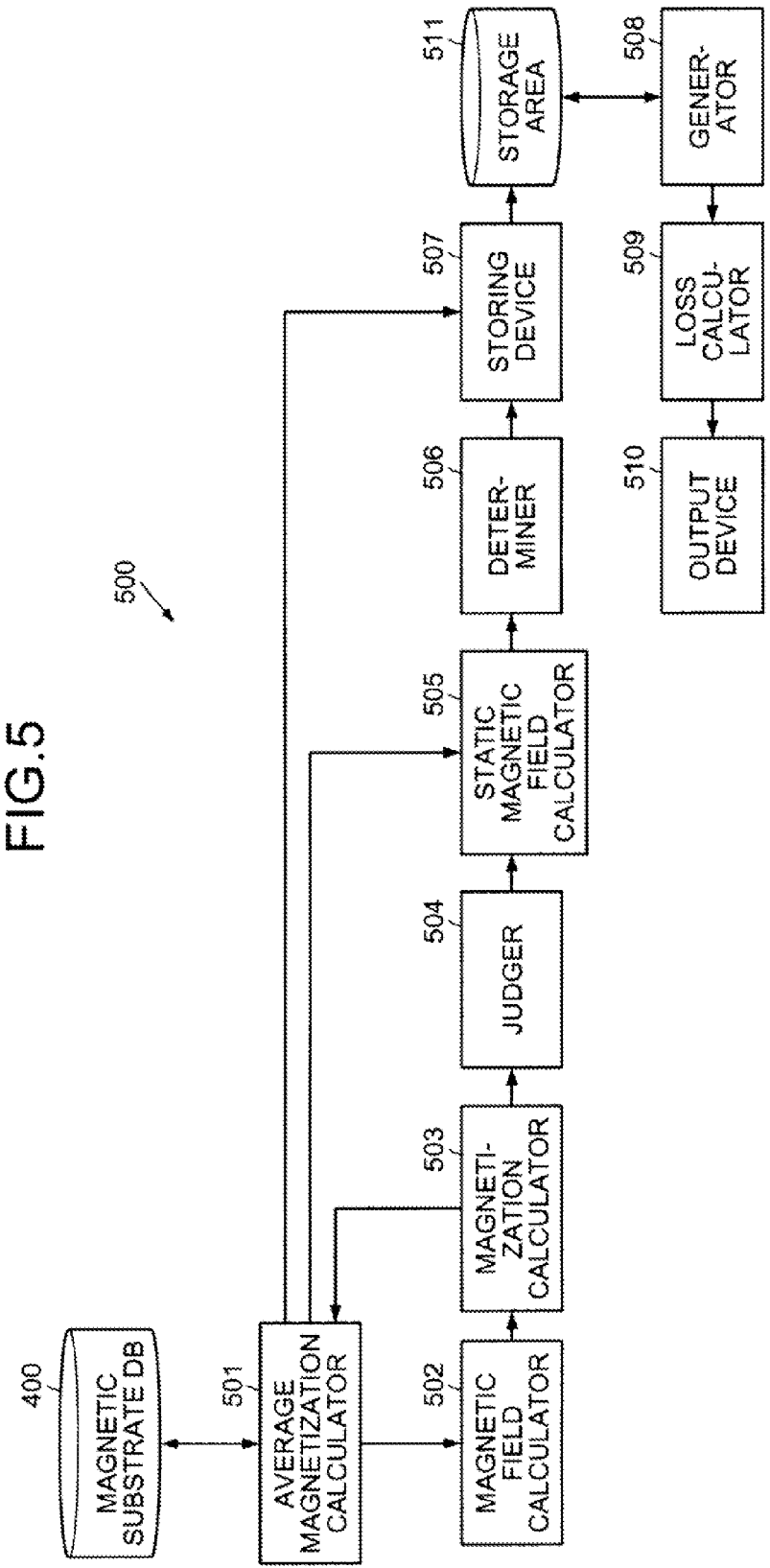

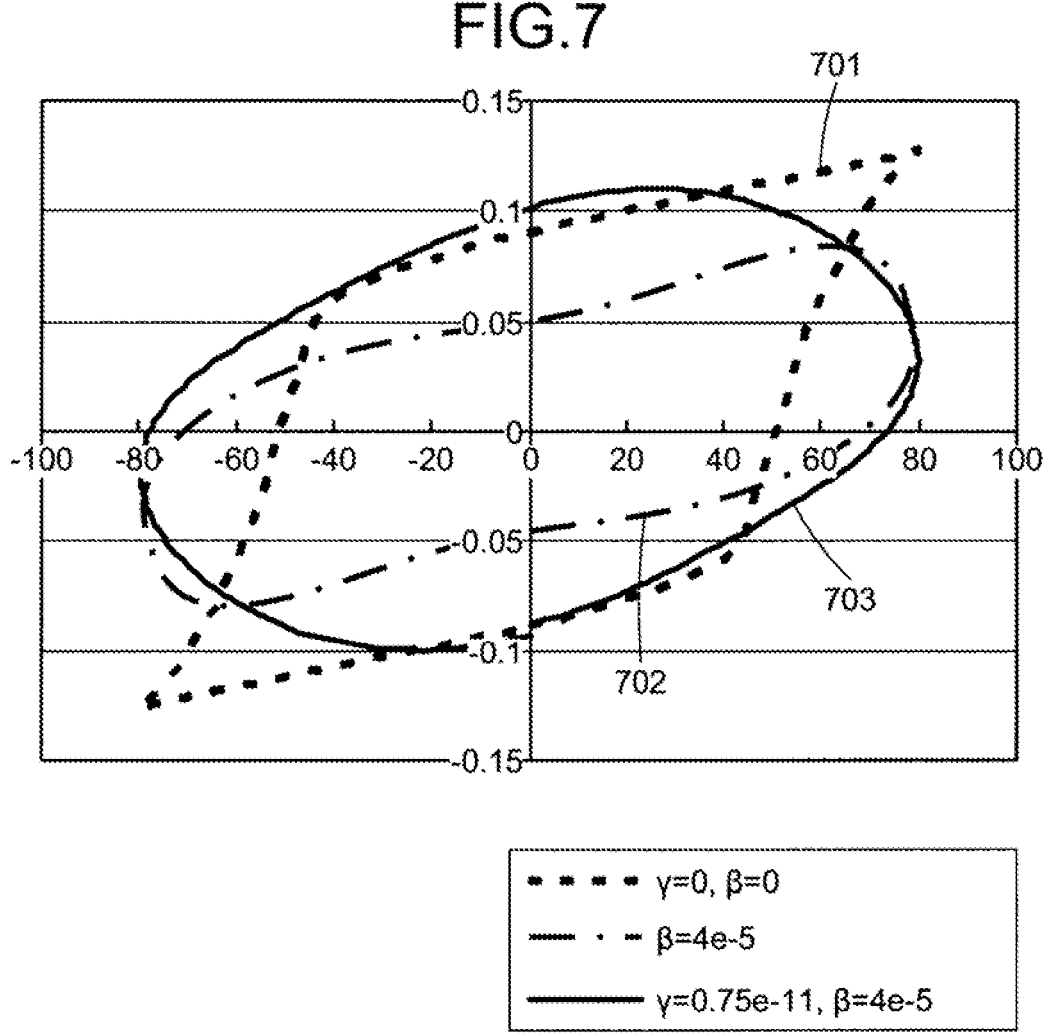

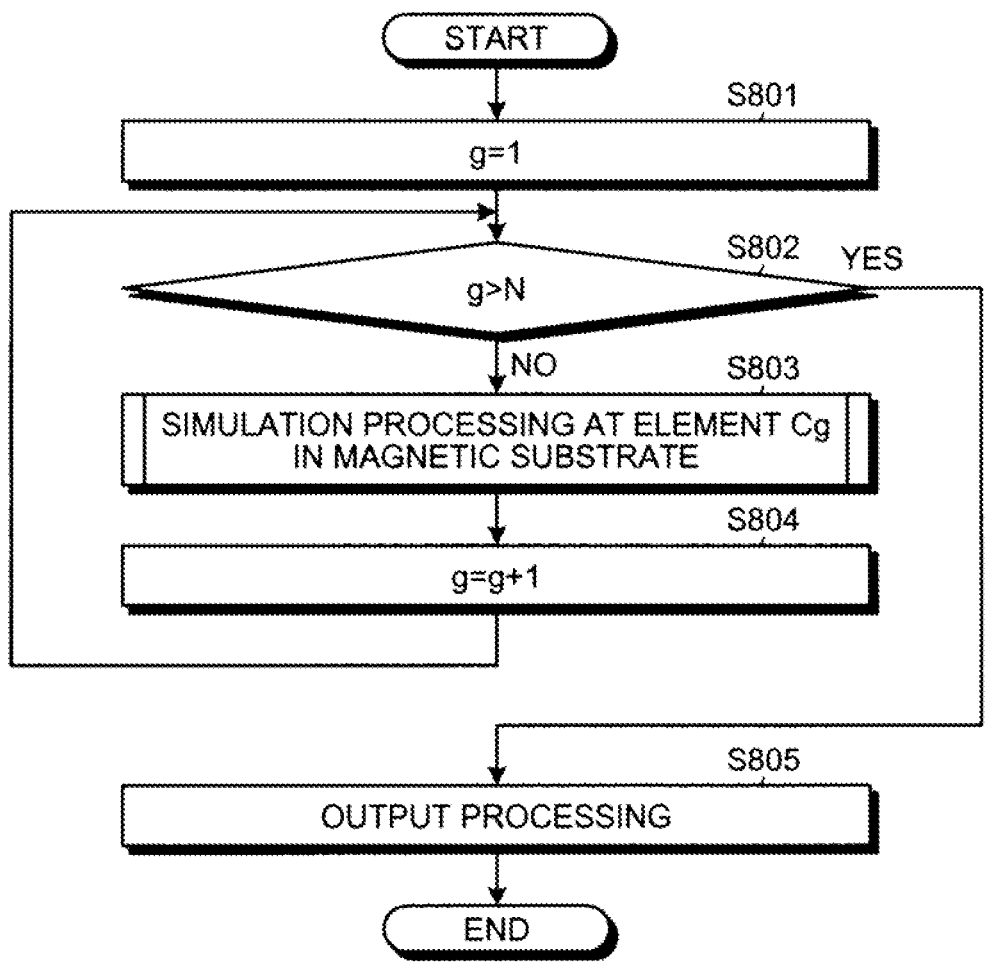

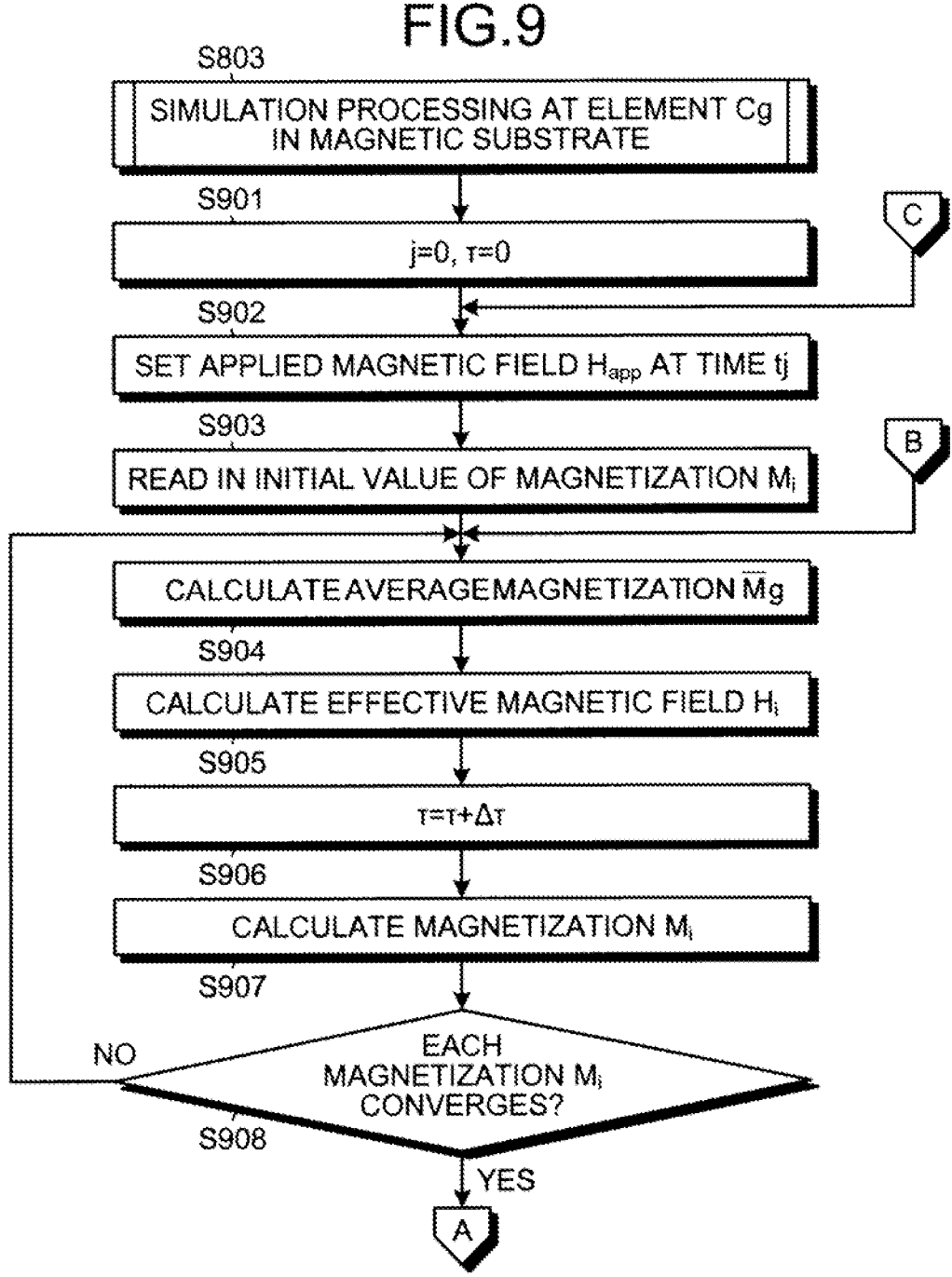

SIMULATION APPARATUS AND SIMULATION METHOD

CROSS REFERENCE TO RELATED APPLICATIONS

This application is based upon and claims the benefit of priority of the prior Japanese Patent Application No. 2011-202398, filed on Sep. 15, 2011, the entire contents of which are incorporated herein by reference.

FIELD

The embodiments discussed herein are related to a simulation apparatus and a simulation method.

BACKGROUND

Conventionally, with improvements in computer performance and advances in electromagnetic field analysis methods, the simulation of electrical devices such as motors and generators that use magnetic materials has become widely performed in a variety of settings. Difference methods and finite element methods are typically used as a method of electromagnetic field analysis. Recently, significant emphasis has been placed on the efficiency of electrical devices as a means of reducing $CO_2$ and preventing global warming. Accordingly, there are greater expectations concerning simulation.

With respect to magnetic metal materials used in electrical devices, for example, in the case of magnetic steel sheeting, loss within the magnetic substrate is classified as hysteresis loss (which is a cause of hysteresis in the magnetic substrate), classic eddy current loss from eddy currents occurring at the magnetic substrate, and anomalous eddy current loss. In the case of magnetic materials used in devices driven at high frequencies, e.g., high-resistivity magnetic materials such as ferrite and amorphous powder material, loss within the magnetic material is classified as hysteresis loss and residual loss (i.e., dynamic magnetic loss).

High-resistivity magnetic materials include oxide magnetic materials of which ferrite is a typical example, amorphous powder materials formed of pressure molded magnetic metal powders processed for electrical insulation, magnetic compound materials of a magnetic metal material and an oxide or nitride, etc.

To calculate the efficiency of an electrical device, the loss within the magnetic substrate has to be accurately obtained. Recently, higher frequencies are applied to the magnetic materials used in motors, etc. consequent to advances in driving technology of which inverters are a typical example and electrical devices are driven on conditions that include, for example, harmonic components on the order of kHz.

One method is used by a finite element method as a method of calculating loss (see, for example, Yamazaki, K., et al, "Iron Loss Analysis of IPM Motor Considering Carrier Harmonics", IEEJ Trans. IA, Vol. 125, No. 7, 2005). Hysterisis loss $W_h$ and eddy current loss $W_e$ when a high frequency magnetic field is applied to a magnetic substrate model are respectively calculated by analysis formulae (1) and (2).

$$W_h = \sum_n \left\{ \int_{iron} K_h D(nf)^2 (B_{r,n}^2 + B_{\theta,n}^2) dv \right\} \quad (1)$$

$$W_e = \sum_n \left\{ \int_{iron} K_e D(nf)^2 (B_{r,n}^2 + B_{\theta,n}^2) dv \right\} \quad (2)$$

Where, $K_h$ is a hysterisis loss coefficient determined by the magnetic material; $K_e$ is an eddy current loss coefficient determined by the magnetic material; f represents frequency; D represents the density of the magnetic substrate; $B_{r,n}$ and $B_{\theta,n}$ respectively represent radial direction and rotational direction magnetic flux densities. In this method, the values differ from the values under actual operating conditions of the electrical device and accurate hysterisis loss and anomalous eddy current loss is difficult to calculate.

Although Matsuo, T., et al, in "Representation of minor hysteresis loops of a silicon steel sheet using stop and play models", http://www.sciencedirect.com, Physica B, Volume 372, Issues 1-2, 1 Feb. 2006, pages 25-29 considers calculation of a hysterisis curve for a magnetic substrate by an analysis method called "Stop and Play Models", such calculation has yet to be used in actual analysis.

As a simulation method that deals with the magnetic domain structure and domain walls of a magnetic substrate, the calculation method by micromagnetics recited by William Fuller Brown, Jr. in "Thermal Fluctuations of a Single-Domain Particle", Physical Review, Volume 130, Number 5, 1 Jun. 1963 is known. Matsuo, T., et al in "A Study of Demagnetizing Field in Micromagnetic Simulation under Periodic Boundary Condition", The Institute of Electrical Engineers of Japan, MAG-10-17, SA10-17, RM10-17, January 2010 consider a hysterisis curve by micromagnetics. However, the method is not applied in actual analysis.

In high frequency transducers and high frequency inductors that use high-resistivity magnetic material, loss consequent to the dynamic magnetization process including resonance phenomena and ferromagnetic resonance of domain walls occurs. Although driving on the order of MHz is considered for these devices and for reducing device size/improving efficiency, in order to do this, design that takes into consideration the resonance and ferromagnetic resonance of domain walls is necessary.

FIG. 15 is a graph of actual data indicating the frequency dependency of permeability when magnetic resonance is present (see, for example, Kawano, K, et al, "The grain size effect on the magnetic properties in NiZn ferrite and the quality factor of the inductor"). The imaginary portion $\mu''$ of permeability indicates the phase difference of a magnetic field H and a magnetic flux density B, where the greater the imaginary portion $\mu''$ is the greater loss is.

Current is difficult to pass through magnetic substrates of a high-resistivity magnetic material, such as ferrite and an amorphous powder material. Meanwhile, according to higher drive frequencies consequent to magnetic resonance such as resonance and ferromagnetic resonance of the domain walls, the loss within the magnetic substrate tends to increase. Therefore, accurate estimation of the loss within the magnetic substrate is an important matter in terms of optimizing the structure and materials of devices. However, with the technologies above, calculation that takes into consideration physical phenomena like magnetic resonance phenomena (such as resonance and ferromagnetic resonance of domain walls) and eddy currents occurring in high-resistivity magnetic material cannot be handled.

SUMMARY

According to an aspect of an embodiment, a computer-readable recording medium has stored therein a program for causing a computer to execute a process for simulating a magnetic substrate. The process includes calculating an effective magnetic field for each area obtained by dividing any given element among a group of elements forming the magnetic substrate, the effective magnetic field of each area being calculated when magnetization of each area changes and based on a magnetic field generated from magnetic energy in each area and a rate of change of magnetization working in a direction inhibiting change in the average magnetization of the areas; obtaining for each area and based on the effective magnetic field calculated for each area and magnetization of each area, the amount of change of magnetization and calculating for each area, magnetization after the change; judging based on magnetization of each area before the change and the magnetization after the change, whether magnetization in the given element converges; and storing to a storage device, a combination of the average magnetization of the areas for which magnetization in the given element is judged to converge and a static magnetic field that is based on the average magnetization.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a block diagram depicting an example of a functional configuration of a simulation apparatus according to a first embodiment;

FIG. 7 is a graph depicting simulation results obtained by the first embodiment;

FIG. 8 is a flowchart of an example of simulation processing by the simulation apparatus according to the first embodiment;

FIGS. 9 and 10 are flowcharts of the simulation processing (step S803) at an element Cg in a magnetic substrate and depicted in FIG. 8;

DESCRIPTION OF EMBODIMENTS

Figure 1:
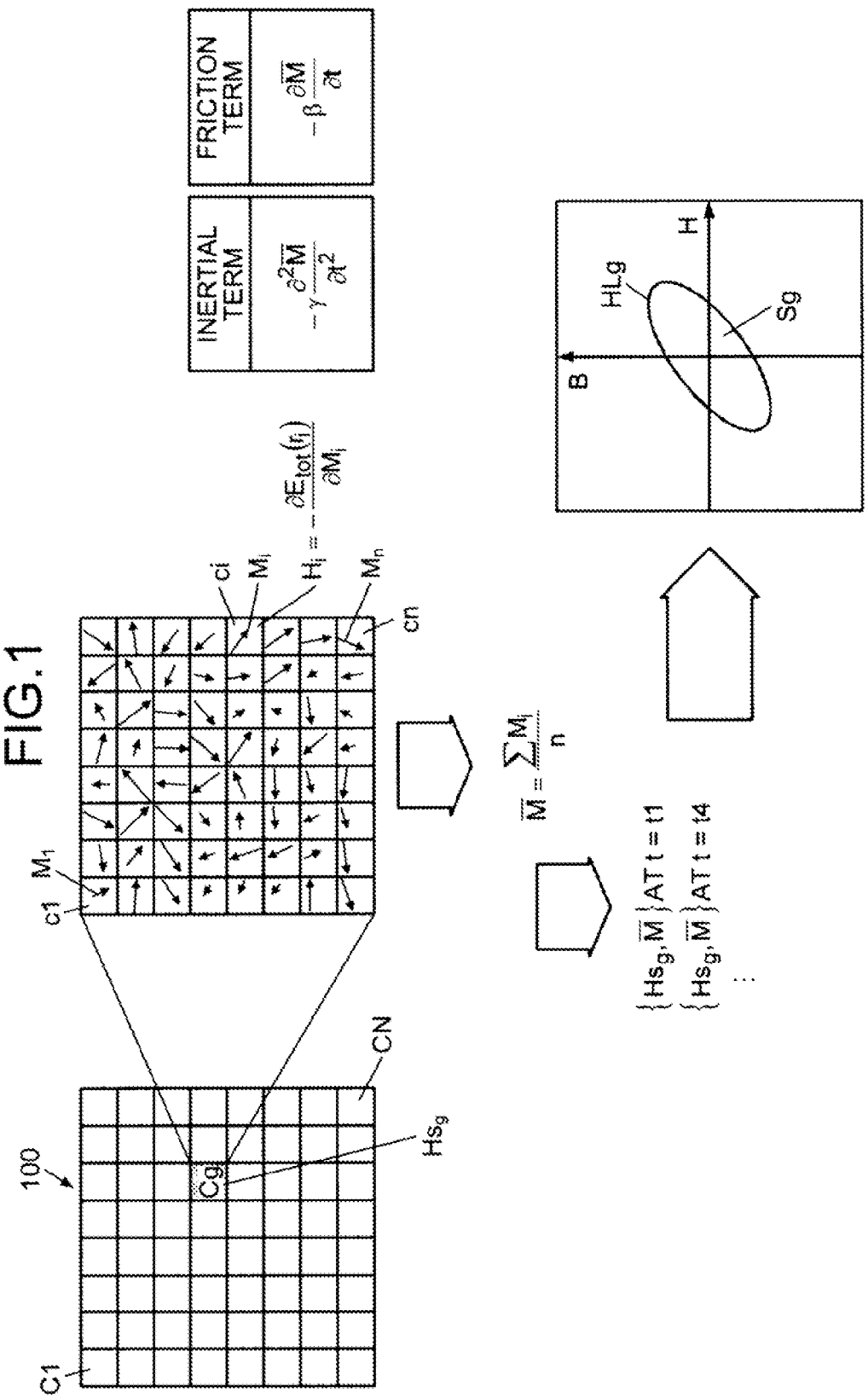
FIG. 1 is a diagram depicting an example of simulation according to a first embodiment.

Preferred embodiments of a simulation program, a simulation apparatus, and a simulation method for a magnetic substrate will be explained with reference to the accompanying drawings. In the description, vectors expressed by bold characters in the drawings and equations are indicated using "[ ]". For example, vector X is indicated as [X]. Further, in the drawings and equations, bars indicated above vectors represent averages. In the description, a vector having a bar is indicated using "[av]". For example, vector X having a bar is indicated as [Xav].

FIG. 1 is a diagram depicting an example of simulation according to a first embodiment. A magnetic substrate model 100 is electronic data that models a magnetic substrate formed by a high-resistivity magnetic material such as ferrite or amorphous powder material. The magnetic substrate formed of high-resistivity magnetic material is, for example, a magnetic substrate having an alternating current magnetic field of a frequency f that is 1.0 MHz or greater. Although the magnetic substrate model 100 is expressed 3-dimensionally, for the sake of convenience, the magnetic substrate model 100 is expressed 2-dimensionally in FIG. 1. The magnetic substrate model 100 is formed by N (N≥2) elements C1 to CN.

An arbitrary element Cg (1≤g≤N) has n (n≥2) sub-elements c1 to cn. The n (N≥2) sub-elements c1 to cn, for example, express micromagnetics magnetization distribution. In micromagnetics, magnetic energies within the magnetic substrate are expressed by the magnetic anisotropy energy $E_{ani}$, magnetostatic energy $E_{mag}$, exchange energy $E_{exc}$, and Zeeman energy $E_{ext}$ equations (3) to (7) below.

$$E_{ani} = K[1 - (k_i \cdot m_i)^2] \; i = 1, 2, \ldots, n \tag{3}$$

$$E_{mag} = -M_i \cdot \left[ \sum_{j \neq i} D_{ij} \cdot M_j + \frac{1}{2} D_{ij} \cdot M_j \right] i = 1, 2, \ldots, n \tag{4}$$

$$D_{ij} = \frac{1}{v_i} \int_{v_i} d r^3 \int_{x_j} d r'^2 \frac{(r - r')\hat{n}'}{|r - r'|^3} \tag{5}$$

$$E_{exc} = -\frac{2A^*}{M^2 a^2} M_i \cdot \sum_{n,n} M_j, \; i = 1, 2, \ldots, n \tag{6}$$

$$E_{ext} = -H_{app} \cdot M_i, \; i = 1, 2, \ldots, n \tag{7}$$

Where, K is a magnetic anisotropy coefficient, [k] is a unit vector of a direction of an easy magnetization axis, [m] is a unit vector of a magnetization direction, [M] is magnetization of sub-element ci, M is the strength of magnetization [M], $D_{ij}$ is a diamagnetic field coefficient that is determined by the geometric configuration of sub-element ci, [r] is a position vector of sub-element ci, [r'] is a position vector of sub-element cj, A* is a stiffness constant, a is a sub-element interval, [$H_{app}$] is an applied magnetic field, and n is the number of sub-element. Σ[$M_j$] in equation (6) is the sum of the magnetization of the sub-element adjacent to the sub-element of [$M_i$].

In FIG. 1, the arrow in each sub-element ci (1≤i≤n) indicates the magnetization [$M_i$]. The magnetization [$M_i$] changes every period Δτ, which is extremely small. The average magnetization [Mav] is obtained by dividing the sum of the magnetization [$M_i$] of each sub-element ci by the number of sub-elements n. The position vector [$m_i$] indicating the magnetization direction in sub-element ci is expressed by [$m_i$]=[$M_i$]/$M_i$.

The total magnetic energy $E_{tot}$ within the element Cg of the magnetic substrate is expressed by the sum of the magnetic anisotropy energy $E_{ani}$, the magnetostatic energy $E_{mag}$, the exchange energy $E_{exc}$, and the Zeeman energy $E_{ext}$ as indicated by equation (8).

$$E_{tot}(r_i) = E_{ani}(r_i) + E_{mag}(r_i) + E_{exc}(r_i) + E_{ext}(r_i) \qquad (8)$$

Further, $[H_i]$ is the effective magnetic field of sub-element ci and is calculated by equation (9).

$$H_i = -\frac{\partial E_{tot}(r_i)}{\partial M_i} - m\frac{\partial^2 \overline{M}}{\partial t^2} - \beta\frac{\partial \overline{M}}{\partial t} \qquad (9)$$

The first term on the left in equation 9 represents the magnetic field consequent to the magnetic energy of the magnetization $[M_i]$ in sub-element ci. The second term is an inertial term. The third term is a friction term. Since the inertial term is an extremely small portion of the rate of magnetization change, the inertial term expresses that a magnetic field works in a direction that keeps the rate of magnetization change constant. Further, since friction is proportional to the rate of magnetization change and works in a direction inhibiting a change in magnetization, the friction term expresses friction against magnetization. The effective magnetic field $[H_i]$ is used in obtaining the temporal change of the magnetization $[M_i]$ at the next time.

Thus, by obtaining the effective magnetic field $[H_i]$ using the friction term, for a sub-element ci, the amount of change $\Delta[M_i]$ from the magnetization $[M_i]$ at time $(\tau-\Delta\tau)$ to the magnetization $[M_i]$ at time $\tau$ can be obtained with consideration of the friction against the magnetization $[M_i]$ at time $(\tau-\Delta\tau)$ and the friction against the magnetization $[M_i]$ at time $\tau$. Thus, behavior inhibiting a change in magnetization can be reproduced for the magnetization $[M_i]$, which changes over time consequent to resonance phenomena.

Further, when the inertial term is used together with the friction term, by obtaining the effective magnetic field $[H_i]$ using the friction term and the inertial term, for the sub-element ci, the amount of change $\Delta[M_i]$ from the magnetization $[M_i]$ at time $(\tau-\Delta\tau)$ to the magnetization $[M_i]$ at time $\tau$ can be obtained with consideration of the friction against the magnetization $[M_i]$ at time $(\tau-\Delta\tau)$ and the friction against the magnetization $[M_i]$ at time $\tau$. Thus, behavior inhibiting a change in the magnetization $[M_i]$, which changes over time consequent to resonance phenomena, and behavior maintaining a constant rate of magnetization change can be reproduced.

Equation (10) is obtained by normalizing the magnetic anisotropy $H_k=2K/M$ in equation (9).

$$h_i = \frac{H_i}{H_k} = (k_i \cdot m_i)k_i + h_m \sum_{j=1}^{N} D_{ij} \cdot m_j + h_a \sum_{n,n} m_j + h_a - \frac{m}{H_k}\frac{\partial^2 \overline{M}}{\partial t^2} - \frac{\beta}{H_k}\frac{\partial \overline{M}}{\partial t} \qquad (10)$$

Where, $h_m$ and $h_e$ are respectively a static magnetic field coefficient and an exchange interaction coefficient normalized by the magnetic anisotropy $H_k$ as depicted by equations (11) and (12). Further, $h_a$ is the applied magnetic field $H_{app}/H_k$ normalized by the magnetic anisotropy $H_k$.

$$h_m = \frac{M}{H_k} \qquad (11)$$

$$h_e = \frac{A^*}{Ka^2} \qquad (12)$$

The movement of magnetization of the magnetic substrate is determined by the Landau-Lifshitz-Gilbert equation (LLG equation) indicated by equation (13).

$$\frac{dm_i}{d\tau} = m_i \times h_i - \alpha m_i \times (m_i \times h_i), i = 1, 2, \ldots n \qquad (13)$$

Where, $\alpha$ is a damping constant. The damping constant $\alpha$ is a constant that is unique to the magnetic substrate and represents the velocity of the attenuation process. The first term on the right of equation (13) is a precession term and the second term is a damping term. In the case of ferrite, for example, $\alpha=0.1$ is used. $\tau$ is a time variable when the calculation of the LLG equation is executed.

Here, a distribution calculation method of the LLG equation is depicted using equation (14). When calculating equation (13), $\alpha\tau$ is the step width of the calculation time of the LLG equation. Here, the step width is the same for each step.

$$m_i^{new} = m_i^{old} + \{m_i^{old} \times h_i - \alpha m_i^{old} \times (m_i^{old} \times h_i)\}\alpha\tau, \quad i=1,2,\ldots n \qquad (14)$$

Where, $[m_i]^{old}$ is $[m_i]$ at the current time step $\tau$ and $[m_i]^{new}$ is $[m_i]$ at the next time step $(\tau+\alpha\tau)$.

The following equations are assessed at each time step.

$$\left(\frac{\partial \overline{M}}{\partial t}\right) = \frac{\overline{M}^j - \overline{M}^{j-1}}{\Delta t} \qquad (15)$$

$$\left(\frac{\partial^2 \overline{M}}{\partial t^2}\right) = \frac{\overline{M}^j - 2\overline{M}^{j-1} + \overline{M}^{j-2}}{\Delta t^2} \qquad (16)$$

Where, $[Mav]^j$ is the average magnetization in an element Cg when (time $t_j$) any among the magnetization $[M_i]$ in the element Cg converges. $[Mav]^{j-1}$ is the average magnetization immediately before $[Mav]^j$, when any among the magnetization $[M_i]$ in the element Cg converge. $[Mav]^{j-2}$ is the average magnetization immediately before $[Mav]^{j-1}$, when any among the magnetization $[M_i]$ in the element Cg converge.

Determination of the magnetization convergence above, for example, is executed according to equation (17).

$$\Delta m = (m_i^{new} - m_i^{old})^2 < \epsilon_m \qquad (17)$$

When any among the magnetization $[M_i]$ satisfy the convergence determination of equation (17), in the element Cg, the average magnetization $[Mav]$ is used to execute static magnetic field calculation. In the static magnetic field calculation, equation (18) is used and the static magnetic field $Hs_g$ is obtained, where u is the inverse of the permeability $\mu$.

$$rot(vrota) = J_0 - \sigma\frac{\partial A}{\partial t} - \sigma \cdot grad\phi \qquad (18)$$

The static magnetic field calculation in the finite element method is calculated using equation (14) derived from Maxwell's equations, which are fundamental equations of electromagnetics. Here, A is magnetic vector potential and $J_0$ is the current flowing in the magnetic substrate and subject to calculation.

In the embodiments, since the magnetic substrate has a high resistance, the current flowing in the magnetic substrate is $J_0=0$. When an external current is present, the effect of the external current has to be considered and therefore, the value of the external current is given to $J_0$. Position coordinates of the element Cg are substituted for the magnetic vector potential A in equation (18), whereby the magnetic vector potential A is obtained. When the magnetic vector potential A is assumed as the magnetic flux density $[B]=\mu[H]+[M]$, the magnetic vector potential A is defined by $[B]=rot(A)$. Therefore, if the magnetic vector potential A is obtained, the magnetic flux density [B] is also obtained. If the magnetic flux density [B] is obtained, by substituting the magnetization [M], the static magnetic field [H] is obtained.

In the present example, by substituting [Mav] for M, the static magnetic field $[Hs_g]$ is obtained by the static magnetic field calculation. Each time the static magnetic field $[Hs_g]$ converges magnetization, a combination of the average magnetization [Mav] and static magnetic field $[Hs_g]$ at that time is stored. Since multiple combinations of the average magnetization [Mav] and the static magnetic field $[Hs_g]$ are yielded, the combinations are plotted as a graph creating a hysterisis curve HLg. The area Sg within the hysterisis curve HLg is the hysterisis loss in the element Cg.

Thus, in the embodiments, even for a magnetic substrate of a high-resistivity magnetic material, hysterisis loss consequent to resonance phenomena of the high-resistivity magnetic material of the magnetic substrate can be obtained with high accuracy since magnetization change consequent to the resonance phenomena can be reproduced with high accuracy.

Figure 2:
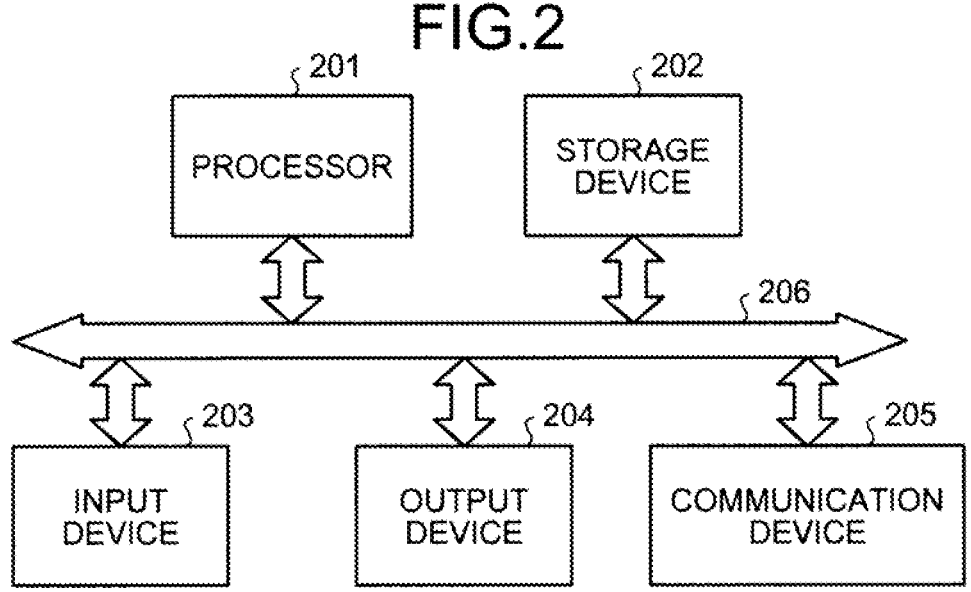
FIG. 2 is a block diagram of an example of a hardware configuration of a computer that executes the simulation.

FIG. 2 is a block diagram of an example of a hardware configuration of a computer that executes the simulation. In FIG. 2, the computer is configured by a processor 201, a storage device 202, an input device 203, an output device 204, and a communication device 205, respectively connected by a bus 206.

The processor 201 governs overall control of the computer. The processor 201 executes various types of programs (an operating system (OS), a simulation program of the embodiments) stored in the storage device 202 and thereby, reads out data from the storage device 202, and writes to the storage device 202, data resulting from software execution.

The storage device 202 is configured by read only memory (ROM), random access memory (RAM), flash memory, a magnetic disk drive, etc., servers as a work area of the processor 201, and stores the various types of programs (the operating system, the simulation program of the embodiments) and various types of data (including data obtained by executing the programs).

The input device 203 is an interface that inputs various types of data via user operation of a keyboard, a mouse, a touch panel, etc. The output device 204 is an interface that outputs data consequent to an instruction of the processor 201. The output device 204 may be a display, a printer, etc. The communication device 205 is an interface that receives data from an external device through a network and transmits data to an external device.

Figure 3:
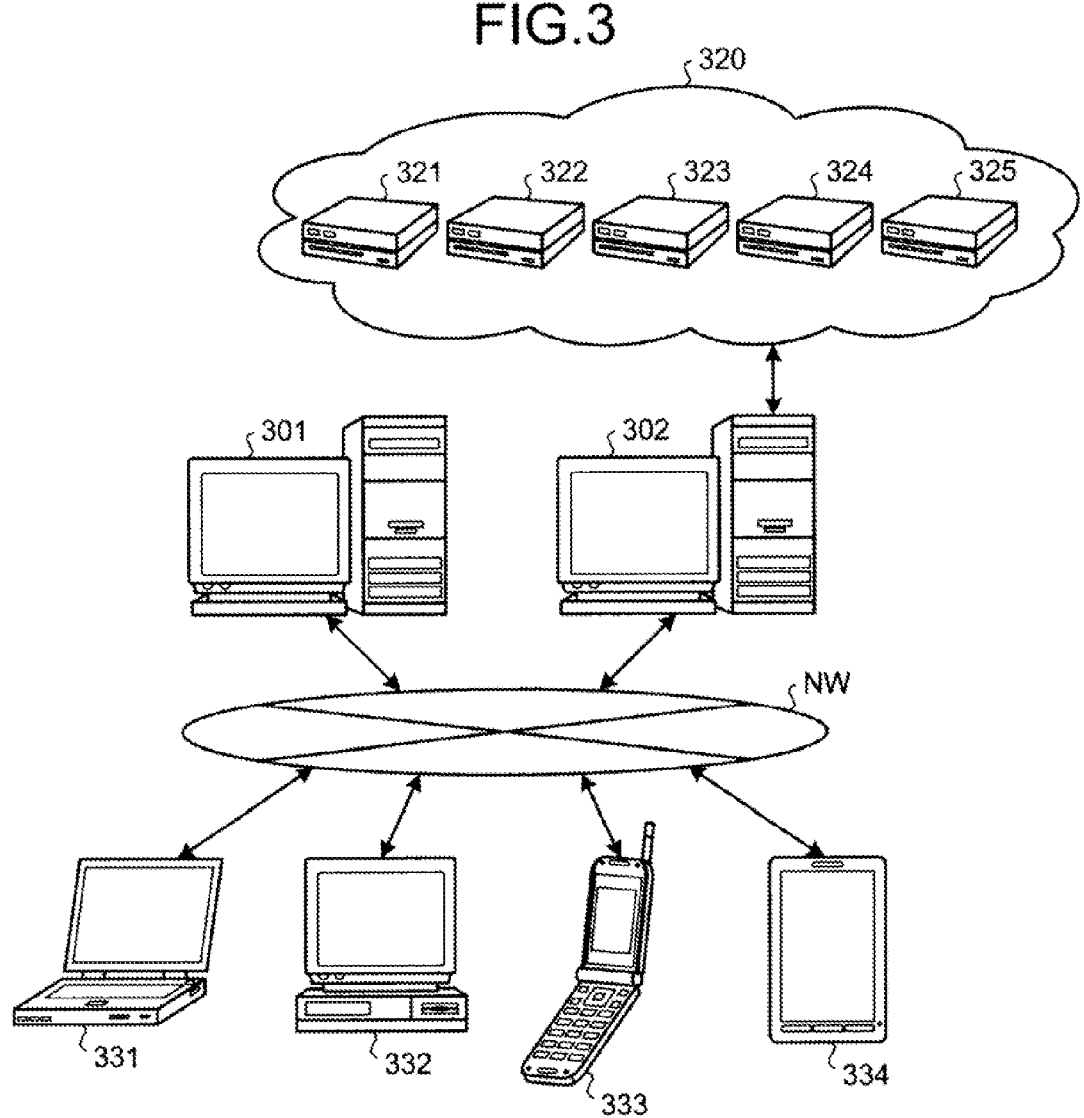
FIG. 3 is a diagram depicting an example of a system that uses the computer depicted in FIG. 2.

FIG. 3 is a diagram depicting an example of a system that uses the computer depicted in FIG. 2. In FIG. 3, a network NW is a network that can communicate with servers 301, 302 and clients 331 to 334, and for example, is configured by a local area network (LAN), a wide area network (WAN), the internet, a mobile telephone network, etc.

The server 302 is a manager server of a group of servers (servers 321 to 325) constituting a client 320. Among the clients 331 to 334, the client 331 is a notebook computer, the client 332 is a desktop computer, the client 333 is a mobile telephone (including a smartphone, a personal handyphone system (PHS) phone), and the client 334 is a tablet terminal. The servers 301, 302, and 321 to 325 and the clients 331 to 334 in FIG. 3, for example, are implemented by the computer depicted in FIG. 2. The clients 331 to 334 are not necessarily connected to the network NW.

Figure 4:
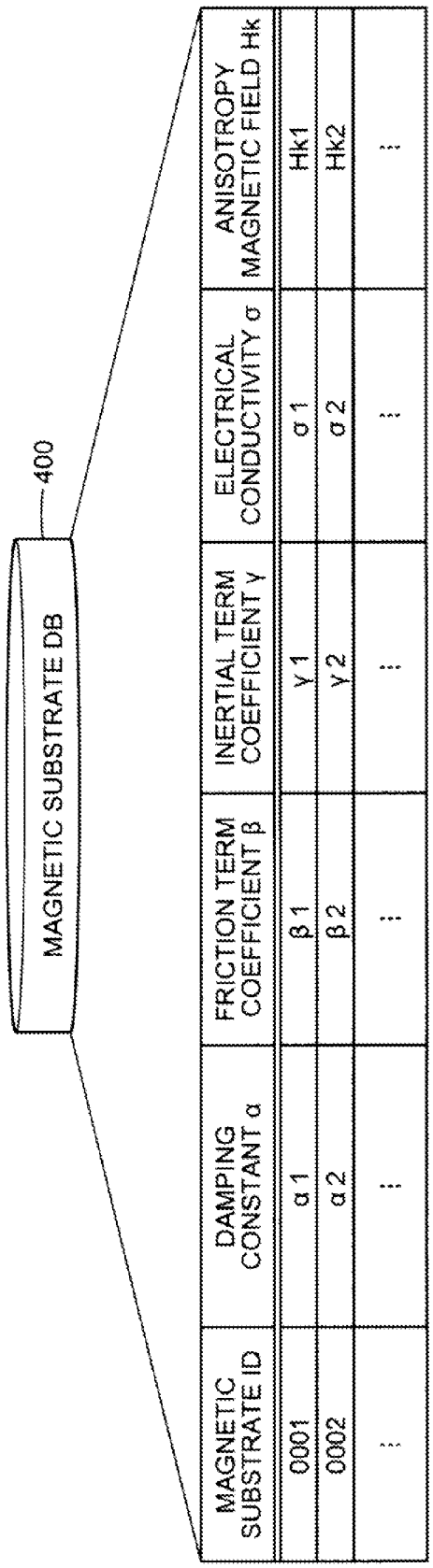
FIG. 4 is a diagram depicting an example of contents stored in a magnetic substrate DB.

FIG. 4 is a diagram depicting an example of the contents stored in a magnetic substrate DB. In FIG. 4, a magnetic substrate DB 400 stores therein according to magnetic substrate, a magnetic substrate ID, a damping constant α, a friction term coefficient β, an inertial term coefficient γ, electrical conductivity σ, and an anisotropy magnetic field Hk.

The electrical conductivity σ and the anisotropy magnetic field Hk are used in the static magnetic field calculation at the element Cg. When a magnetic substrate ID is specified by the computer, the values of each item in the record of the specified magnetic substrate ID is read out from the magnetic substrate DB 400. The magnetic substrate DB 400, for example, is implemented by the storage device 202 depicted in FIG. 2.

FIG. 5 is a block diagram depicting an example of a functional configuration of a simulation apparatus according to the first embodiment. A simulation apparatus 500 has the magnetic substrate DB 400 and a storage area 511. The simulation apparatus 500 further has an average magnetization calculator 501, a magnetic field calculator 502, a magnetization calculator 503, a judger 504, a static magnetic field calculator 505, a determiner 506, a storing device 507, a generator 508, a loss calculator 509, and an output device 510. The average magnetization calculator 501 to the output device 510, for example, are implemented by executing on the processor 201, the simulation program stored in the storage device 202 depicted in FIG. 2. The storage area 511 is implemented by the storage device 202 depicted in FIG. 2.

The average magnetization calculator 501, each time the time τ changes by Δτ, calculates the average magnetization [Mav] of the magnetization $[M_1]$ to $[M_n]$ of the sub-elements c1 to cn in the element Cg. For example, the average magnetization [Mav] is calculated by equation (19).

$$\overline{M} = \frac{\sum M_i}{n} \tag{19}$$

The magnetic field calculator 502, upon an updating of the magnetization of each area of a group of areas into which any one element among elements configuring the magnetic substrate is divided, calculates for each area, the effective magnetic field based on the magnetic field generated by the magnetic energy in the area, the rate of change of magnetization working in a direction that inhibits changes in the average magnetization of the updated magnetization for each area, and the inertia bringing about the magnetic field in a direction that keeps the rate of magnetization change constant.

Here, "the magnetic field generated by the magnetic energy in the area" is the magnetic field generated by the magnetic energy in the sub-element ci and corresponds to the first term on the right in equation (9). "The rate of change of magnetization working in a direction that inhibits changes in the average magnetization of the updated magnetization for each area" is the rate of change of magnetization working in a direction that inhibits changes in the average magnetization [Mav] and corresponds to the friction term (third term on the right) in equation (9). "The inertia bringing about the magnetic field in a direction that keeps the rate of magnetization change constant" is the inertia bringing about the magnetic field in a direction that keeps the rate of magnetization change expressed by the friction term of equation (9) constant, and corresponds to the inertial term (second term on the right) in equation (9).

The magnetic field calculator 502 calculates the effective magnetic field $[h_i]$ of the sub-element ci, by equation (9), each time the time $\tau$ changes by $\Delta\tau$. The inertial term may be excluded from the right side of equation (9). The effective magnetic field $[H_i]$ is used in obtaining the magnetization $[M_i]$ at the next time.

Thus, by obtaining the effective magnetic field $[H_i]$ using the friction term, for a sub-element ci, the amount of change $\Delta[M_i]$ from the magnetization $[M_i]$ at time $(\tau-\Delta\tau)$ to the magnetization $[M_i]$ at time $\tau$ can be obtained with consideration of the friction against the magnetization $[M_i]$ at time $(\tau-\Delta\tau)$ and the friction against the magnetization $[M_i]$ at time $\tau$. Thus, behavior inhibiting a change in magnetization can be reproduced for the magnetization $[M_i]$, which changes over time consequent to resonance phenomena.

Further, when the inertial term is used together with the friction term, by obtaining the effective magnetic field $[H_i]$ using the friction term and the inertial term, for the sub-element ci, the amount of change $\Delta[M_i]$ from the magnetization $[M_i]$ at time $(\tau-\Delta\tau)$ to the magnetization $[M_i]$ at time t can be obtained with consideration of the friction against the magnetization $[M_i]$ at time $(\tau-\Delta\tau)$ and the friction against the magnetization $[M_i]$ at time $\tau$. Thus, behavior inhibiting a change in the magnetization $[M_i]$, which changes over time consequent to resonance phenomena, and behavior maintaining a constant rate of magnetization change can be reproduced.

The magnetization calculator 503 calculates the magnetization for each area by obtaining the amount of change in magnetization for each area, based on the effective magnetic field calculated for each area and the magnetization of each area. The magnetization calculator 503 calculates the amount of change in magnetization before the magnetization calculation. The amount of change in magnetization is the amount of change of the unit vector $[m_i]$ of the magnetization $[M_i]$ when the time changes from $\tau$ to $\tau+\Delta\tau$, e.g., is expressed by the second term on the right in equation (14). When the position vector is updated from $[m_i]^{old}$ to $[m_i]^{new}$ by equation (14), the updated $[m_i]^{new}$ is multiplied by the magnitude $M_i$ of the magnetization NJ, whereby the updated magnetization $[M_i]$ is calculated. The calculated magnetization $[M_i]$ is provided to the magnetic field calculator 502 and the effective magnetic field $[H_i]$ at the next time is calculated.

The judger 504, based on the magnetization before change and the magnetization after change obtained for each area by the magnetization calculator 503, judges magnetization convergence among any elements. For example, the judger 504, for the element Cg, uses $[m_i]^{old}$ before the update and $[m_i]^{new}$ after the update to make the judgment by equation (17).

The static magnetic field calculator 505 uses equation (18) and calculates the static magnetic field $Hs_g$ of the element C. For example, when each of magnetization $[M_i]$ is judged by the judger 504 to satisfy magnetization convergence conditions of equation (17) at the same time $\tau$, the static magnetic field calculator 505 calculates the static magnetic field $Hs_g$ of the element Cg. Vacuum permeability, for example may be used as the permeability $\mu$ used in the static magnetic field calculation.

The determiner 506 determines whether the static magnetic field satisfies a magnetic field convergence condition. For example, the determiner 506 determines magnetic field convergence if the difference $\Delta Hs$ of the static magnetic field $[Hs_g]^{new}$ for the current time and the static magnetic field $[Hs_g]^{old}$ for the previous time is within a threshold $\epsilon h$.

The storing device 507 stores to the storage area 511, a combination of the average magnetization $[M_i]$ at time tj when magnetization convergence conditions of equation (17) are satisfied and the static magnetic field $Hs_g$ that has been determined by the determiner 506 to satisfy magnetic field convergence conditions. Stored combinations of the average magnetization $[M_i]$ and the static magnetic field $Hs_g$ become the source of a hysterisis curve.

The generator 508 plots the stored combinations of the average magnetization $[M_i]$ and the static magnetic field $[Hs_g]$ to a graph where the horizontal axis represents the magnetic field and the vertical axis represents the magnetic flux density and thereby generates a hysterisis curve. The generator 508 substitutes the average magnetization [Mav] and the static magnetic field $[Hs_g]$ into the magnetic flux density $[B]=\mu[H]+[M]$ and thereby, obtains the magnetic flux density $[B]$ for each time tj. Thus, a hysterisis curve can be generated.

The loss calculator 509 calculates hysterisis loss by calculating the area of the hysterisis curve generated by the generator 508. Thus, hysterisis loss that considers the friction term and the inertial term of equation (9) can be obtained.

The output device 510 outputs the hysterisis loss calculated by the loss calculator 509. The output device 510 may display the hysterisis loss on a display and print out the hysterisis loss by a printer. The output device may further transmit the hysterisis loss to an external device and store the hysterisis loss to the storage device 202. The output device 510 may further output the hysterisis curve generated by the generator 508. Here, an example of the hysterisis curve will be described.

Figure 6A:
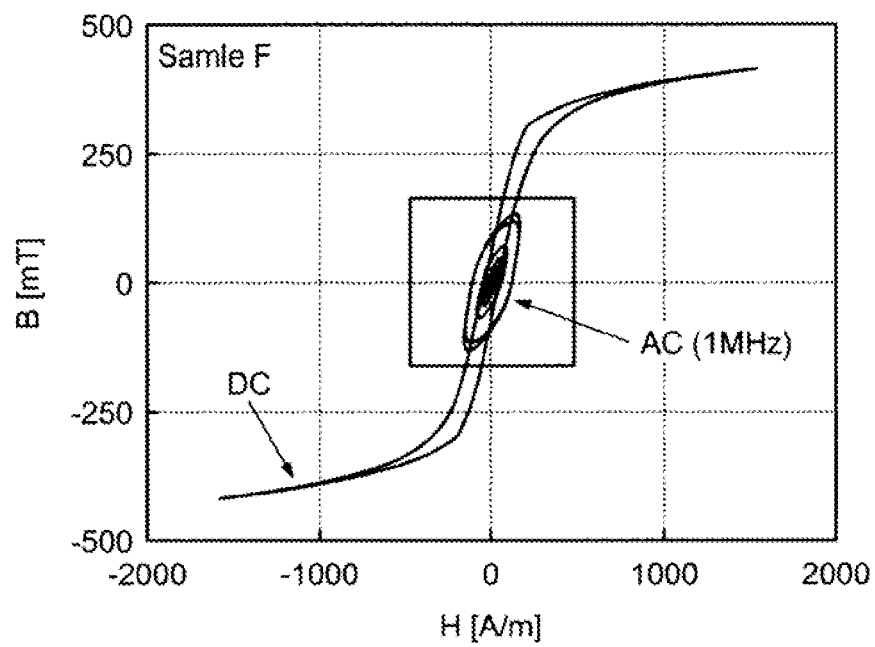
FIGS. 6A and 6B are graphs depicting a hysterisis curve for direct current with respect to ferrite and actual data of a hysterisis curve for 1.0 MHz.
Figure 6B:
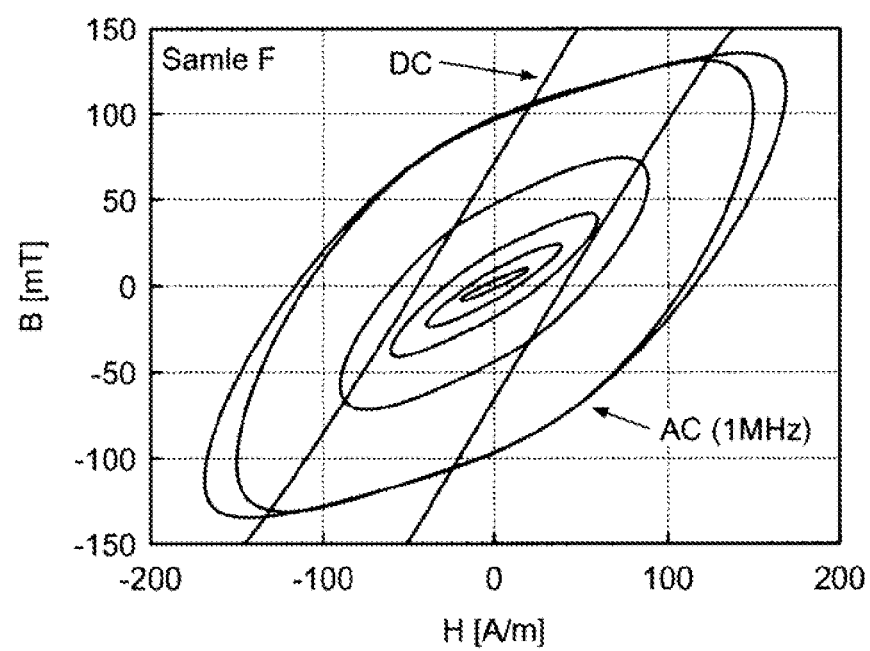

FIGS. 6A and 6B are graphs depicting a hysterisis curve for direct current with respect to ferrite and actual data of a hysterisis curve for 1.0 MHz. FIG. 6B is an enlarged view of FIG. 6A. The area within the loop of the hysterisis curve is known as the energy loss consumed in the magnetic substrate for 1 cycle.

FIG. 7 is a graph depicting simulation results obtained by the first embodiment. A hysterisis curve calculated by setting the inertial term and the friction term in equation (9) as 0 is represented by a dotted line 701. A hysterisis curve calculated by setting only the inertial term as 0 is represented by a broken line 702. A hysterisis curve calculated by including the inertial term and the friction term is represented by a solid line 703. The hysterisis curve represented by the solid line 703 is an ellipse, reproducing the actual hysterisis curve. The hysterisis curves represented by dotted line 701 and the broken line 702 cannot be reproduced by an ellipse. In FIG. 7, the frequency f=1.0 MHz, $\gamma=0.75\times10^{-11}$, and $\beta=4.0\times10^{-5}$ are assumed.

FIG. 8 is a flowchart of an example of simulation processing by the simulation apparatus 500 according to the first embodiment. The simulation apparatus 500 sets, as g=1, a variable g that identifies an element (step S801), and judges whether g>N is true (step S802). N is the total number of elements. If g>N is not true (step S802: NO), the simulation apparatus 500 executes simulation processing at the element Cg in the magnetic substrate (step S803).

Subsequently, the simulation apparatus 500 increments g (step S804), and returns to step S802. At step S802, if g>N is true (step S802: YES), since no elements Cg for which simulation is to be performed are present, the simulation apparatus 500 executes output processing by the output device 510 (step S805), and ends the simulation processing. In FIG. 8, although simulation processing (step S803) is sequentially executed for each element Cg, simulation processing may be executed in parallel.

Figure 10:
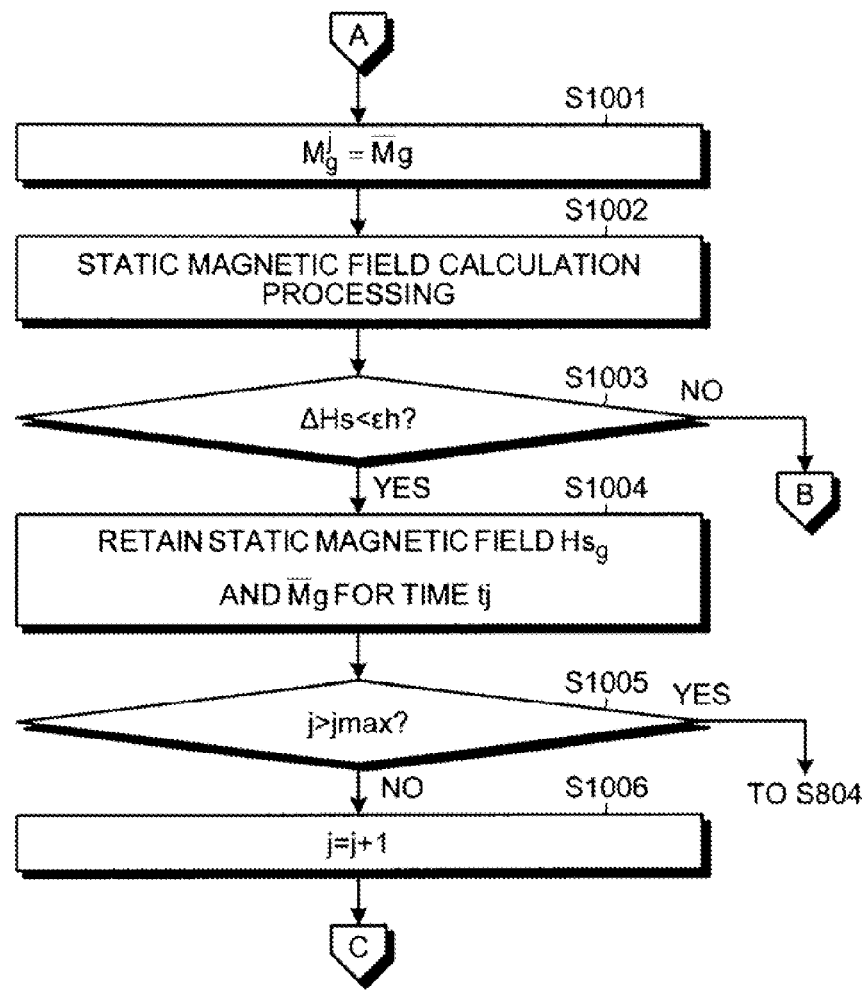

FIGS. 9 and 10 are flowcharts of the simulation processing (step S803) at the element Cg in the magnetic substrate and depicted in FIG. 8. The simulation apparatus 500 sets a time variable j and an update time τ as j=0 and τ=0 respectively (step S901). The simulation apparatus 500 sets the applied magnetic field $[H_{app}]$ at the time tj (step S902). The applied magnetic field $[H_{app}]$ is a magnetic field determined by the frequency f and the time tj. The frequency f is assumed to be preliminarily provided. The applied magnetic field $[H_{app}]$ is used in equation (7).

The simulation apparatus 500 reads in the initial value of the magnetization $[M_i]$ from the storage device 202 (step S903). The initial value of the magnetization $[M_i]$ is, for example, preliminarily stored to the storage device 202 and assumed to be read in from the storage device 202 when simulation is started.

Subsequently, the simulation apparatus 500, via the average magnetization calculator 501, calculates the average magnetization $[M_g av]$ at the time τ (step S904). The simulation apparatus 500, via the magnetic field calculator 502, calculates the effective magnetic field $[H_i]$ at the time τ (step S905).

The simulation apparatus 500 waits until a given period Δτ has elapsed since the time τ (step S906), uses the LLG equation (equation (13)), and calculates the amount of change of the unit vector $[m_i]$ of the magnetization $[M_i]$ and thereby calculates the magnetization $[M_i]$ using equation (14) via the magnetization calculator 503 (step S907). The simulation apparatus 500 uses the magnetization $[M_i]$ before and after the change and judges for each sub-element c1 via the judger 504, whether magnetization convergence conditions are satisfied (step S908).

If magnetization convergence conditions are not satisfied by any 1 of the sub-elements ci (step S908: NO), the simulation apparatus 500 returns to step S904, and calculates the average magnetization [Mav] from magnetization $[M_i]$ updated at the step S907. On the other hand, if at each of the sub-elements ci, magnetization convergence conditions are satisfied (step S908: YES), the simulation apparatus 500 transitions to step S1001 depicted in FIG. 10.

In FIG. 10, the simulation apparatus 500 sets $[M]^j$ to be the latest average magnetization [Mav] obtained at step S904 (step S1001). The $[M]^j$ is a value used by the friction term in equation (15) and the inertial term in equation (16). Since j is incremented at step S1006 (subsequent step), in calculations of the effective magnetic field thereafter (step S905), the value is $[M_g]^{j-1}$.

The simulation apparatus 500, via the static magnetic field calculator 505, uses equation (18) and executes static magnetic field calculation processing (step S1002). The simulation apparatus 500, via the determiner 506, determines whether static magnetic field $[Hs_g]$ satisfies magnetic field convergence conditions (step S1003). If not (step S1003: NO), the simulation apparatus 500 returns to step S904 in FIG. 9. The combination the static magnetic field $[Hs_g]$ and the average magnetization [Mav] at this time is not stored the storage area 511 and is not reflected in the hysteresis curve.

On the other hand, if magnetic field convergence conditions are satisfied (step S1003: YES), the simulation apparatus 500 retains in the storage area 511, the static magnetic field $[Hs_g]^j$ and the magnetization $[Mav]^j$ at the time tj (step S1004) and judges whether j>jmax is true (step S1005), where jmax is the maximum value of the variable j and tjmax is the simulation period. If j>jmax is not true (step S1006: NO), the simulation apparatus 500 increments j (step S1006), returns to step S902 in FIG. 9, and resets the applied magnetic field $[H_{app}]$ at the time tj that is after the incrementing.

Consequent to the incrementing of j, the average magnetization $[Mav]^j$ updated at step S1001 becomes the average magnetization $[Mav]^{j-1}$ and the average magnetization $[Mav]^{j-1}$ becomes the average magnetization $[Mav]^{j-2}$. Thus, the calculation of the friction term (equation (15)) and the inertial term (equation (16)) can be performed. Meanwhile, if j>jmax is true (step S1005: YES), the simulation apparatus 500 transitions to step S804 in FIG. 8 since the simulation processing at the element Cg has been completed.

Thus, according to the embodiment, the effective magnetic field $[H_i]$ can be obtained with consideration of friction, enabling behavior that inhibits a change in magnetization to be reproduced for the magnetization $[M_i]$, which changes over time consequent to resonance phenomena. Therefore, a hysterisis curve reflecting effects of the behavior can be obtained, enabling hysteresis loss to be obtained with high accuracy for a magnetic substrate of high-resistivity magnetic material at a high frequency.

Further, when the inertial term is used together with the friction term, the effective magnetic field $[H_i]$ can be obtained with consideration of friction and inertia, thereby enabling behavior that inhibits a change in the magnetization $[M_i]$, which changes over time consequent to resonance phenomena, and behavior that maintains a constant rate of magnetization change to be reproduced. Therefore, a hysteresis curve reflecting effects of the behaviors can be obtained, enabling hysteresis loss to be obtained with high accuracy for a magnetic substrate of high-resistivity magnetic material at a high frequency.

In the embodiment, in the simulation apparatus 500, the generator 508 generates the hysterisis curve and the loss calculator 509 calculates the hysteresis loss. However, the generator 508 and the loss calculator 509 may be implemented by another device that is not the simulation apparatus 500. For example, in the simulation apparatus 500, the storing device 507 may store to the storage area 511, the combination of the static magnetic field $[Hs_g]^j$ and the average magnetization $[Mav]^j$ at the time tj, and transmit the combination to an external device having the generator 508 and the loss calculator 509.

A second embodiment will be described. In the first embodiment, concerning magnetic substrates of a high-resistivity magnetic material, simulation that takes the effects of magnetic resonance into consideration is executed. However, the second embodiment is an example of executing simulation that takes the effects of domain wall resonance into consideration. When domain wall resonance is considered, from the perspective of micromagnetics, it is preferable to handle the inverse of magnetization alone. In micromagnetics, the handling of only the inverse of magnetization is to respond to domain wall motion. In the case of a typical 180 degree domain wall, each magnetization $[M_i]$ is inverted by 180 degrees consequent to domain wall motion. Thus, within a given time step j, an inverted magnetization $[M_i]^j$ represents magnetization change consequent to domain wall motion.

Therefore, in the second embodiment, when equation (9) is applied, as depicted by equation (20), the velocity of magnetization inversion is used in place of the friction term on the right and as depicted by equation (21), the acceleration of magnetization inversion is used.

$$\left(\frac{\partial \overline{M}}{\partial t}\right) = \frac{\Delta M^j}{\Delta t} \tag{20}$$

$$\left(\frac{\partial^2 \overline{M}}{\partial t^2}\right) = \frac{\Delta M^j - \Delta M^{j-1}}{\Delta t^2} \tag{21}$$

Where, $\Delta[M]^j$ is the magnitude of magnetization inversion and the magnitude of magnetization inversion is obtained by equation (22).

$$\Delta M^j = \Sigma(M_i^j - M_i^{j-1}) \tag{22}$$

Where, $$M_i^j \cdot M_i^{j-1} < 0 \tag{23}$$

The magnitude of magnetization inversion $\Delta[M]^j$ is the sum of $\{[M_i]^j - [M_i]^{j-1}\}$ concerning the magnetization $[M_i]$ of a sub-element ci that is among the sub-elements c1 to cn of the element Cg and satisfies the magnetization inversion conditions of equation (23).

Figure 11:
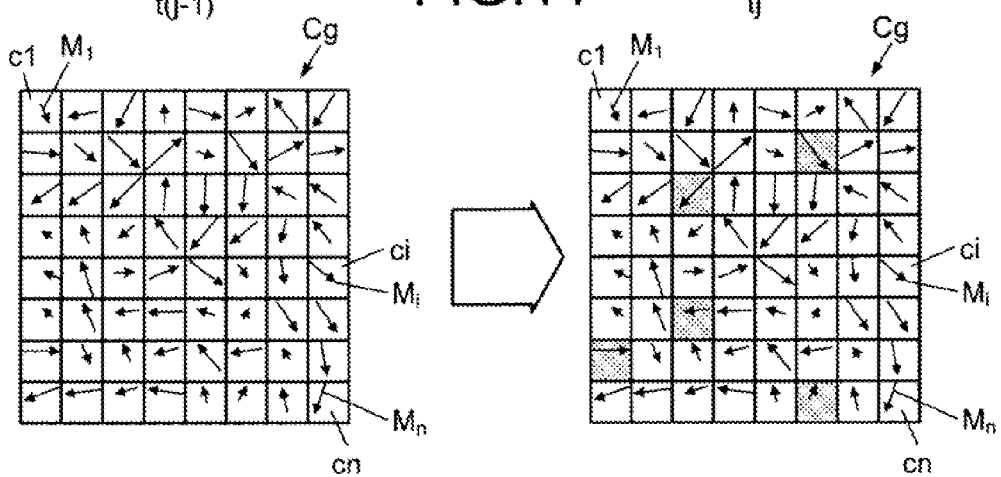
FIG. 11 is a diagram depicting changes in the magnetization distribution in the element Cg at times t(j−1) to tj.

FIG. 11 is a diagram depicting changes in the magnetization distribution in the element Cg at times t(j−1) to tj. Hatched sub-elements in the element Cg at time tj are sub-elements whose magnetization has been inverted. In equation (22), the sum of $\{[M_i]^j - [M_i]^{j-1}\}$ is performed with respect to the hatched sub-elements depicted in FIG. 11.

Figure 12:
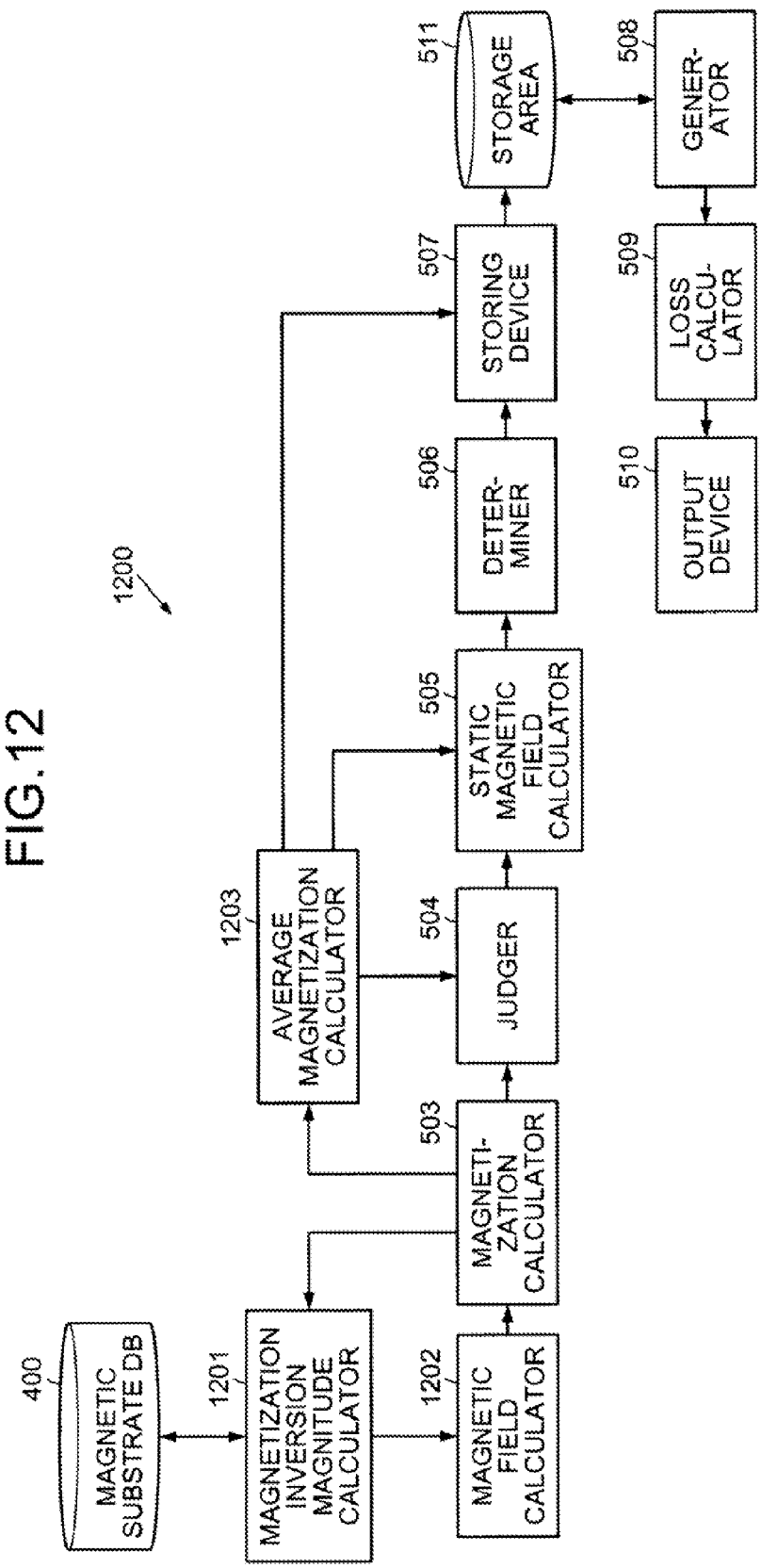
FIG. 12 is a block diagram of a functional configuration of the simulation apparatus according to a second embodiment.

FIG. 12 is a block diagram of a functional configuration of a simulation apparatus 1200 according to the second embodiment. In FIG. 12, components identical to those depicted in FIG. 5 are given the same reference numerals used in FIG. 5 and description thereof is omitted. Components differing from those depicted in FIG. 5 will be described. A magnetization inversion magnitude calculator 1201 calculates the magnitude of magnetization inversion $\Delta[M]^j$ in the element Cg at time tj. The method of calculation uses, equations (22) and (23).

A magnetic field calculator 1202, based on the magnitude of magnetization inversion calculated by the magnetization inversion magnitude calculator 1201, obtains the magnetization inversion velocity and the magnetization inversion acceleration. The magnetic field calculator 1202 calculates the effective magnetic field $[H_i]$ by replacing the friction term and the inertial term in equation (9) of the first embodiment with the magnetization inversion velocity and magnetization inversion acceleration.

Similar to the first embodiment, in the calculation of the effective magnetic field $[H_i]$, the magnetization inversion velocity alone may be applied, or both the magnetization inversion velocity and the magnetization inversion acceleration may be applied. If the magnetization inversion velocity alone is applied, the calculation load can be reduced. If both the magnetization inversion velocity and the magnetization inversion acceleration are applied, domain wall resonance phenomena can be reproduced with high accuracy.

An average magnetization calculator 1203 calculates the average magnetization [Mav] of the magnetization $[M_1]$ to $[M_n]$ in the element Cg at time τ. In the second embodiment, when the effective magnetic field is calculated, the average magnetization is not calculated. Therefore, for the calculation of the static magnetic field, when magnetization convergence conditions have been judged to be satisfied by the judger 504, the average magnetization [Mav] is calculated and used in the calculation of the static magnetic field.

The magnetization inversion magnitude calculator 1201, the magnetic field calculator 1202, and the average magnetization calculator 1203, for example, are implemented by executing on the processor 201, the simulation program stored in the storage device 202 depicted in FIG. 2.

An example of simulation processing according to the second embodiment will be described. Operations identical to those in the first embodiment are given the same step number used in the first embodiment and description thereof is omitted. Operations differing from those in the first embodiment will be described.

Figure 13:
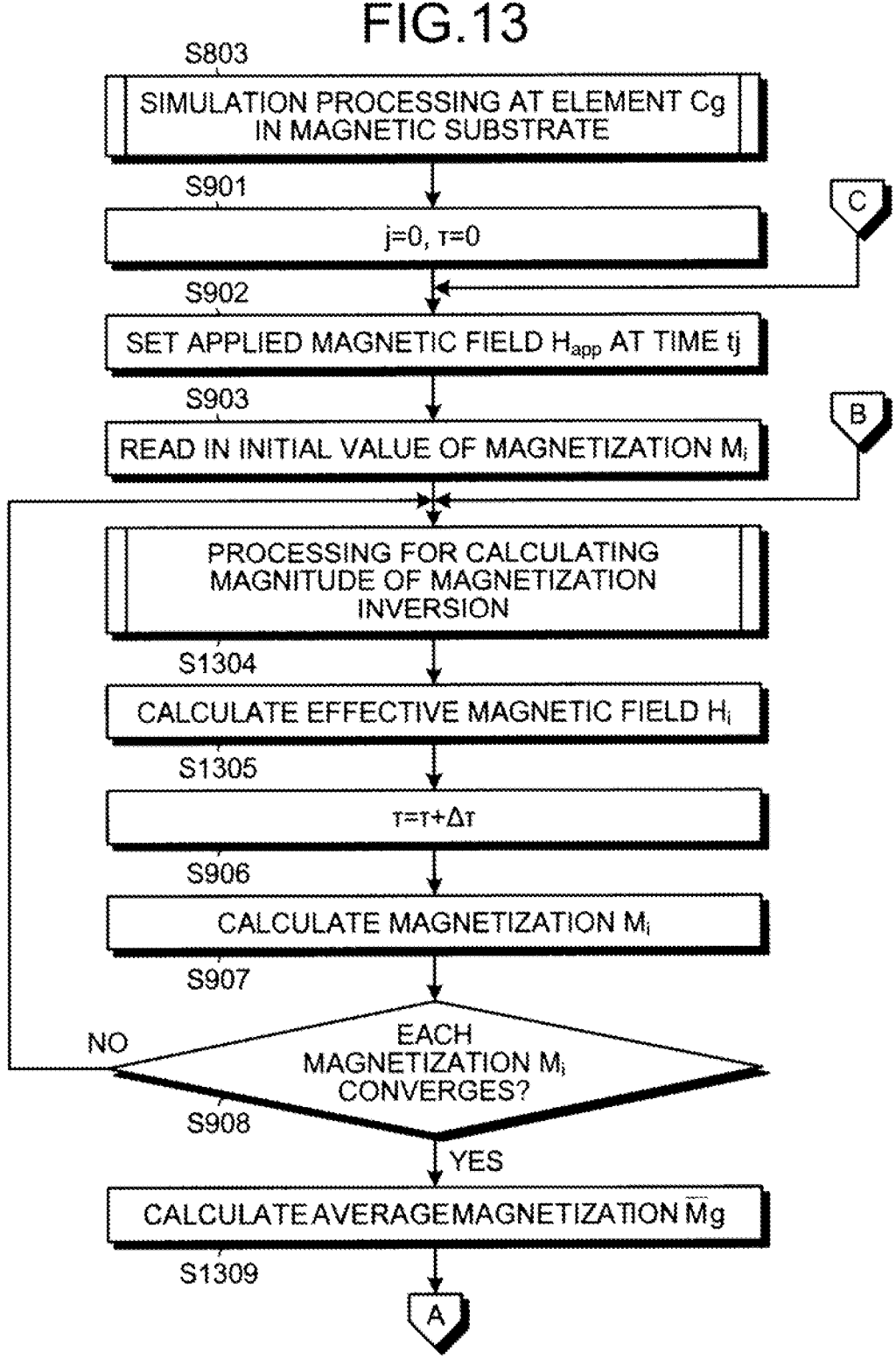
FIG. 13 is a flowchart of the simulation processing (step S803) at the element Cg in the magnetic substrate according to the second embodiment.

FIG. 13 is a flowchart of the simulation processing (step S803) at the element Cg in the magnetic substrate according to the second embodiment. Steps S901 to S903 are identical to those in the first embodiment and description thereof is omitted. After step S903, the simulation apparatus 1200, via the magnetization inversion magnitude calculator 1201, executes processing for calculating the magnitude of magnetization inversion (step S1304). In the processing for calculating the magnitude of magnetization inversion (step S1304), the magnitude of magnetization inversion $\Delta[M]^j$ at element Cg is calculated, the details of which will be described with reference to FIG. 14.

The simulation apparatus 1200, via the magnetic field calculator 1202, calculates the effective magnetic field $[H_i]$ based on the magnitude of magnetization inversion $\Delta[M]^j$ (step S1305). The simulation apparatus 1200 waits until a given period Δτ has elapsed since the time τ (step S906), uses the LLG equation (equation (13)), and calculates the amount of change of the unit vector$[m_i]$ of the magnetization $[M_i]$ and thereby updates the magnetization $[M_i]$ using equation (14) via the magnetization calculator 503 (step S907). The simulation apparatus 1200 uses the magnetization $[M_i]$ before and after the update and judges for each sub-element ci via the judger 504, whether magnetization convergence conditions are satisfied (step S908).

If magnetization convergence conditions are not satisfied by any 1 of the sub-elements ci (step S908: NO), the simulation apparatus 1200 returns to step S1304, and executes processing for calculating the magnitude of magnetization inversion (step S1304). On the other hand, if at each of the sub-elements ci, magnetization convergence conditions are satisfied (step S908: YES), the simulation apparatus 1200, via the average magnetization calculator 1203, calculates the average magnetization $[M_gav]$ (step S1309), and transitions to step S1001 depicted in FIG. 10.

Figure 14:
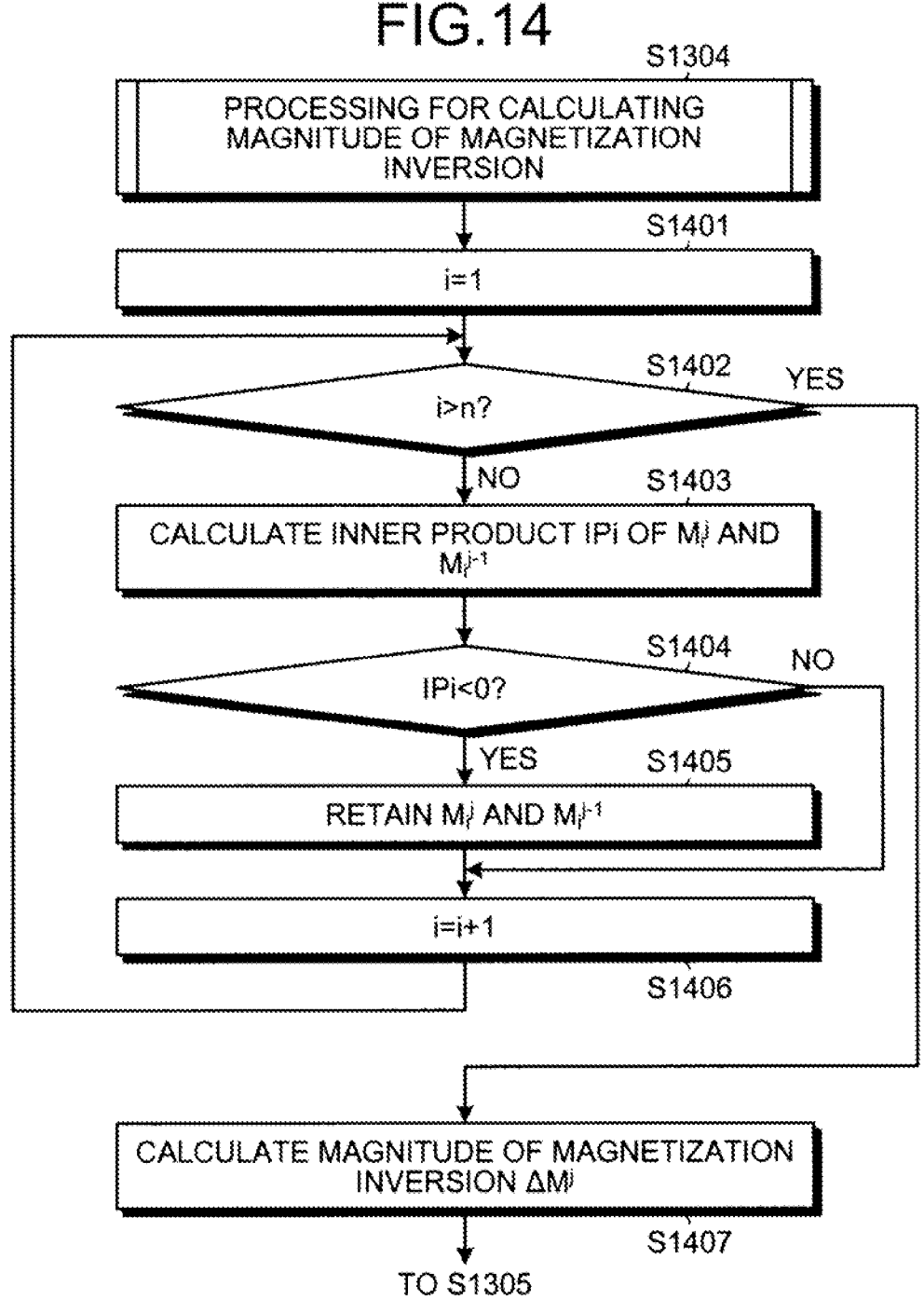
FIG. 14 is a flowchart depicting an example of operations of processing for calculating the magnitude of magnetization inversion (step S1304) depicted in FIG. 13.
Figure 15:
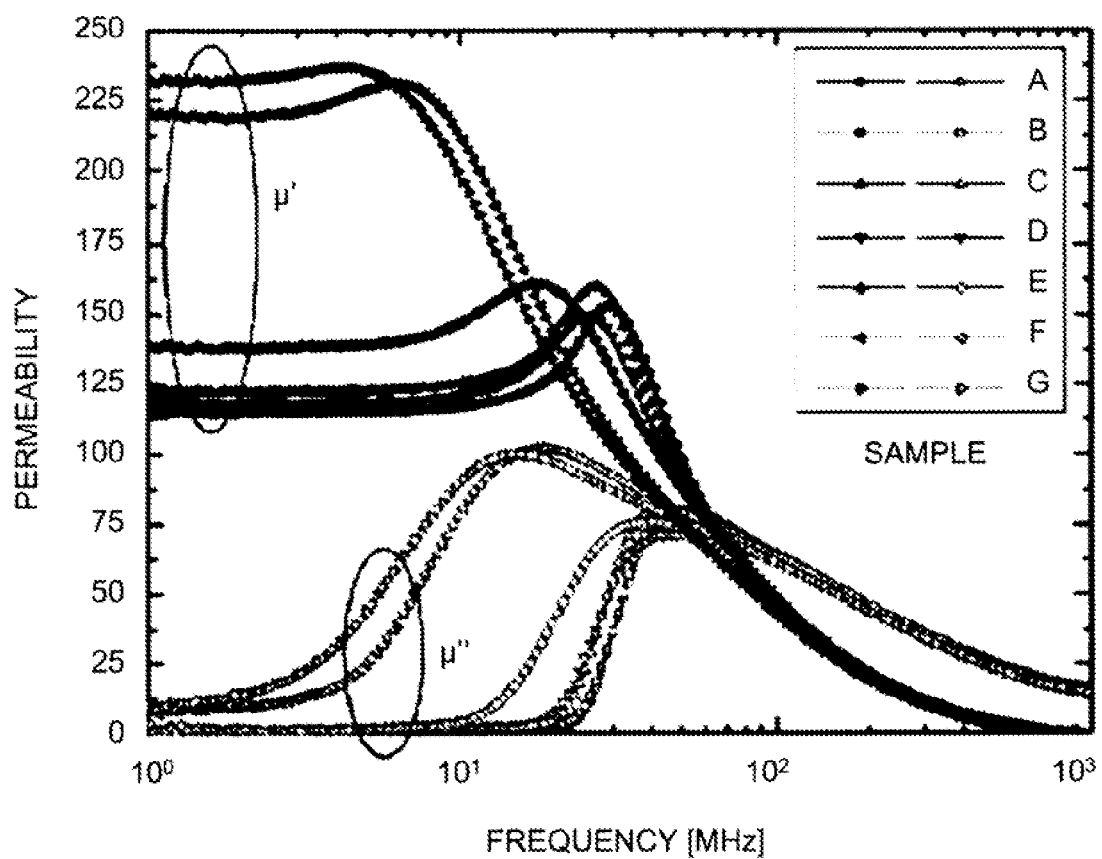
FIG. 15 is a graph of actual data indicating the frequency dependency of permeability when magnetic resonance is present.

FIG. 14 is a flowchart depicting an example of operations of the processing for calculating the magnitude of magnetization inversion (step S1304) depicted in FIG. 13. The simulation apparatus 1200 sets variable i, which identifies a sub-element, as i=1 (step S1401), and judges whether i>n is true (step S1402), where n is the total number of sub-elements. If i>n is not true (step S1402: NO), the simulation apparatus 1200 calculates the inner product IPi of the magnetization $[M_i]^j$ and the magnetization $[M_i]^{j-1}$ (step S1403). The simulation apparatus 1200, as a magnetization inversion condition, judges whether IPi<0 is true (step S1404).

If IPi<0 is true (step S1404: YES), magnetization $[M_i]^j$ is the inversion of the magnetization $[M_i]^{j-1}$ and therefore, the magnetization $[M_i]^j$ and the magnetization $[M_i]^{j-1}$ are retained in the storage device 202 (step S1405), and the simulation apparatus 1200 transitions to step S1406. On the other hand, if IPi<0 is not true (step S1404: NO), the magnetization has not been inverted and therefore, the simulation apparatus 1200 transitions to step S1406 without retaining the magnetization $[M_i]^j$ and the magnetization $[M_i]^{j-1}$ in the storage device 202.

At step S1406, the simulation apparatus 1200 increments i (step S1406), and returns to step S1402. At step S1402, if i>n is true (step S1402: YES), the simulation apparatus 1200 calculates the magnitude of magnetization inversion Δ[M]' by equation (22) (step S1407), transitions to step S1305, and calculates the effective magnetic field [H$_i$].

Thus, in the second embodiment, by executing simulation that considers the effects of domain wall resonance, domain wall motion can be coped with and improved accuracy in the reproduction of domain wall resonance phenomena can be achieved. Thus, accurate hysterisis loss can be obtained.

According to one aspect of the invention, simulation that considers the occurrence of resonance phenomena and/or eddy currents in a magnetic substrate of a high-resistivity magnetic material can be executed.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process for simulating a magnetic substrate, the process comprising:
    calculating, when magnetization of each area changes, an effective magnetic field for each area that is obtained by dividing any given element among a group of elements forming the magnetic substrate, the effective magnetic field including a magnetic field generated from magnetic energy in each area and a rate of change of magnetization working in a direction inhibiting change in the average magnetization of the areas based on:

$$H_i = -\frac{\partial E_{tot}(r_i)}{\partial M_i} - \beta\frac{\partial \overline{M}}{\partial t}$$

wherein H$_i$ is the effective magnetic field of sub-element ci, E$_{tot}$ is the total magnetic energy, r$_i$ is a position vector of sub-element ci, M$_i$ is magnetization of sub element ci, [Mav1 is the average magnetization, and β is a constant;
   obtaining magnetization after the direction inhibiting change by calculating the amount of change of magnetization based on the effective magnetic field calculated for each area and magnetization of each area;
   judging whether magnetization in the given element converges based on magnetization of each area before the direction inhibiting change and the magnetization after the direction inhibiting change; and
   storing a pair of the average magnetization of the areas and the static magnetic field that is based on the average magnetization to a storage device when magnetization in the given element is judged to converge.

2. The computer-readable recording medium according to claim 1, wherein the calculating of the effective magnetic field includes calculating the effective magnetic field for each area when the magnetization of each area changes and based on the magnetic field generated by magnetic energy in the areas, the rate of change of the magnetization, and inertia bringing about the magnetic field in a direction that keeps the rate of change of the magnetization constant.

3. The computer-readable recording medium according to claim 1, wherein the process further comprises calculating hysterisis loss, which is calculated and from the area of a hysterisis curve obtained from a group of combinations of the average magnetization and the static magnetic field stored in the storage device.

4. A simulation apparatus that simulates a magnetic substrate, the simulation apparatus comprising:
    a processor that:
        calculates, when magnetization of each area changes, an effective magnetic field for each area that is obtained by dividing any given element among a group of elements forming the magnetic substrate, the effective magnetic field including a magnetic field generated from magnetic energy in each area and a rate of change of magnetization working in a direction inhibiting change in the average magnetization of the areas based on:

$$H_i = -\frac{\partial E_{tot}(r_i)}{\partial M_i} - \beta\frac{\partial \overline{M}}{\partial t}$$

wherein H$_i$ is the effective magnetic field of sub-element ci, E$_{tot}$ is the total magnetic energy, r$_i$ is a position vector of sub-element ci, M$_i$ is magnetization of sub-element ci, [Mav] is the average magnetization, and β is a constant,
   obtains magnetization after the direction inhibiting change by calculating the amount of change of magnetization based on the effective magnetic field calculated for each area and magnetization of each area,
   judges whether magnetization in the given element converges based on magnetization of each area before the direction inhibiting change and the magnetization after the direction inhibiting change, and
   stores a pair of the average magnetization of the areas and the static magnetic field that is based on the average magnetization to a storage device when magnetization in the given element is judged to converge.

5. A simulation method that is for a magnetic substrate and executed by a computer, the simulation method comprising:
    calculating, when magnetization of each area changes an effective magnetic field for each area that is obtained by dividing any given element among a group of elements forming the magnetic substrate, the effective magnetic field including a magnetic field generated from magnetic energy in each area and a rate of change of magnetization working in a direction inhibiting change in the average magnetization of the areas based on:

$$H_i = -\frac{\partial E_{tot}(r_i)}{\partial M_i} - \beta\frac{\partial \overline{M}}{\partial t}$$

wherein H$_i$ is the effective magnetic field of sub-element ci, E$_{tot}$ is the total magnetic energy, r$_i$ is a position vector of sub-element ci, M$_i$ is magnetization of sub-element ci, [Mav] is the average magnetization, and β is a constant;
   obtaining magnetization after the direction inhibiting change by calculating the amount of change of magnetization based on the effective magnetic field calculated for each area and magnetization of each area;

judging whether magnetization in the given element converges based on magnetization of each area before the direction inhibiting change and the magnetization after the direction inhibiting change; and storing a pair of the average magnetization of the areas and the static magnetic field that is based on the average magnetization to a storage device when magnetization in the given element is judged to converge.

* * * * *